No. 664,193. Patented Dec. 18, 1900.
G. A. TURNBULL.
MACHINE FOR MAKING EXPANDED METAL.
(Application filed July 23, 1900.)
(No Model.) 6 Sheets—Sheet 1.
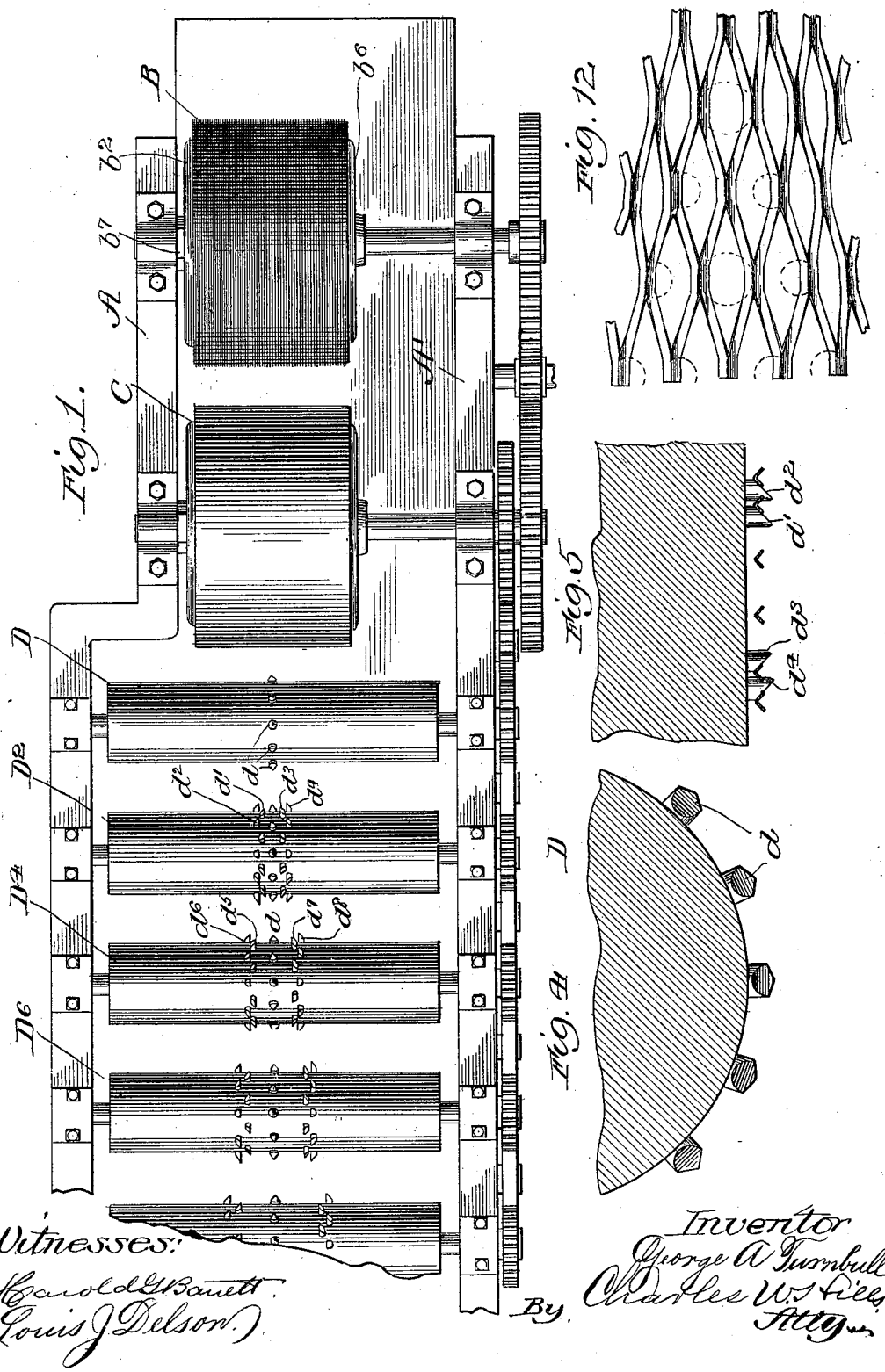
Witnesses:
Harold G. Barrett
Louis J. Delson
Inventor
George A. Turnbull
By Charles W. Fields
Atty.

No. 664,193. Patented Dec. 18, 1900.
G. A. TURNBULL.
MACHINE FOR MAKING EXPANDED METAL.
(Application filed July 23, 1900.)
(No Model.) 6 Sheets—Sheet 2.
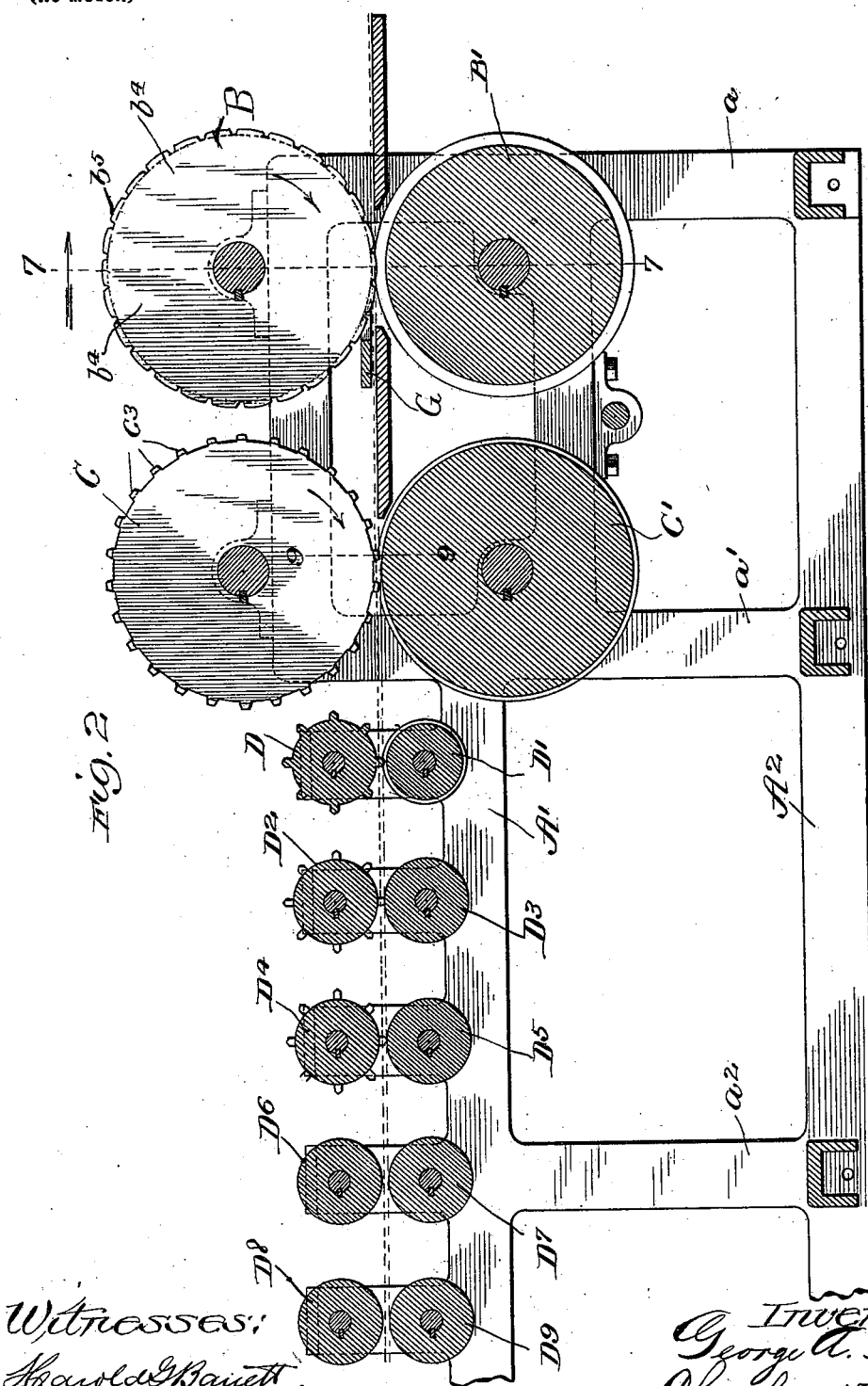

No. 664,193. Patented Dec. 18, 1900.
G. A. TURNBULL.
MACHINE FOR MAKING EXPANDED METAL.
(Application filed July 23, 1900.)
(No Model.) 6 Sheets—Sheet 3.
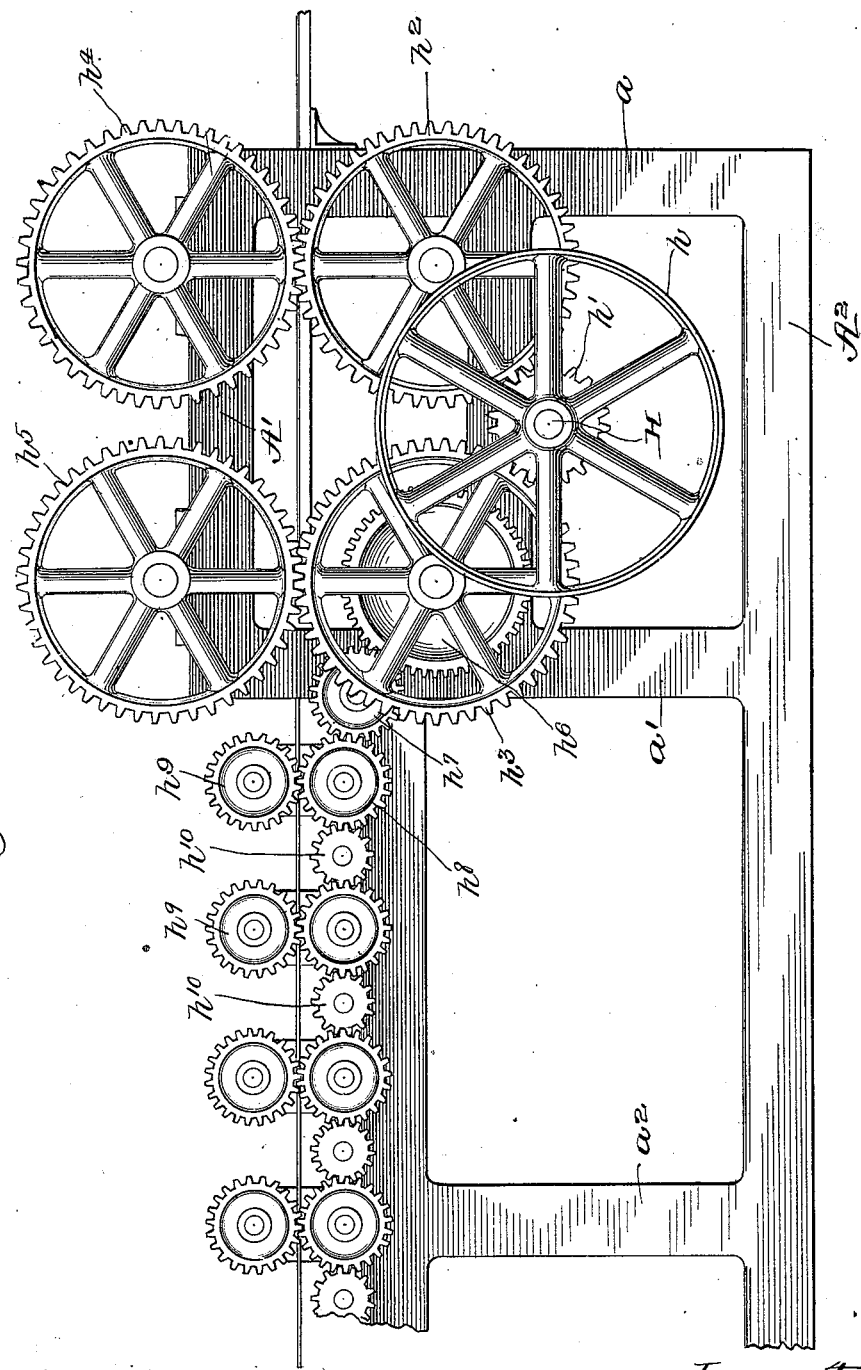

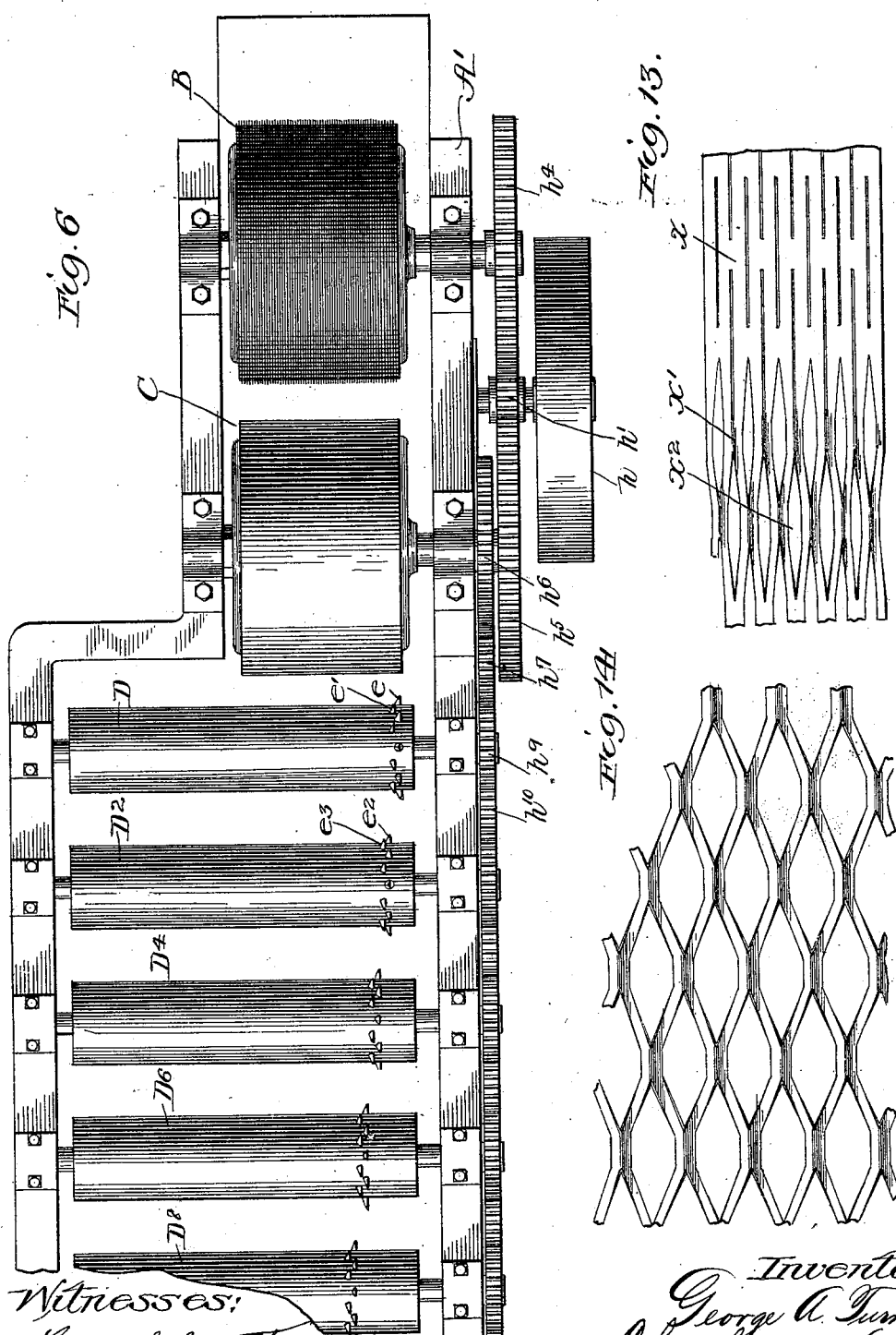

No. 664,193. Patented Dec. 18, 1900.
G. A. TURNBULL.
MACHINE FOR MAKING EXPANDED METAL.
(Application filed July 23, 1900.)
(No Model.) 6 Sheets—Sheet 5.
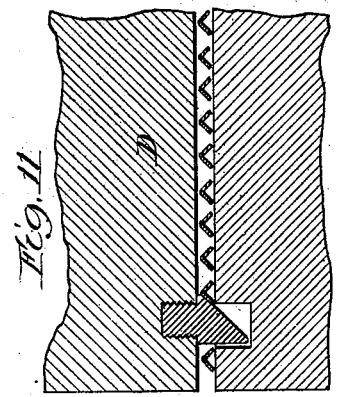
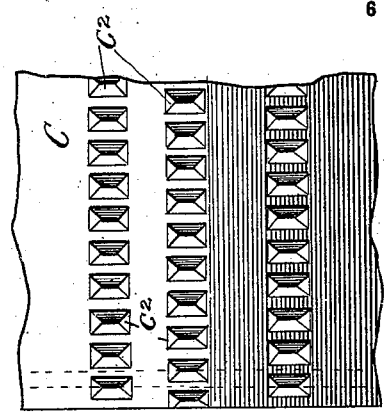
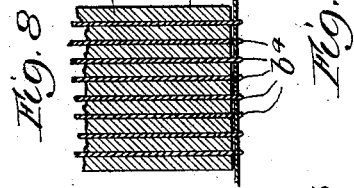
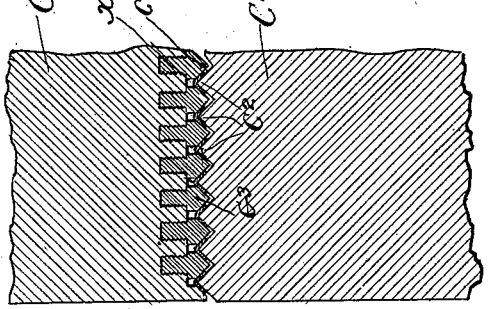
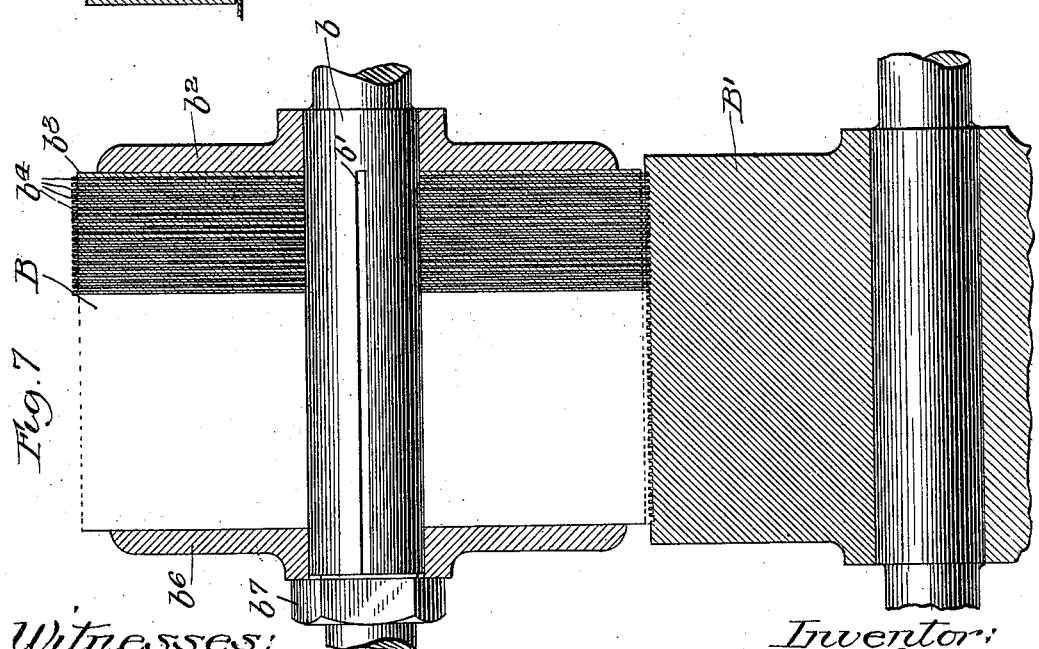
Witnesses:
Anna B. Hills
Louis J. Delson
Inventor:
George A. Turnbull
By Charles W. Hills,
Atty.

No. 664,193. Patented Dec. 18, 1900.
G. A. TURNBULL.
MACHINE FOR MAKING EXPANDED METAL.
(Application filed July 23, 1900.)
(No Model.) 6 Sheets—Sheet 6.
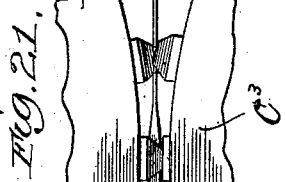
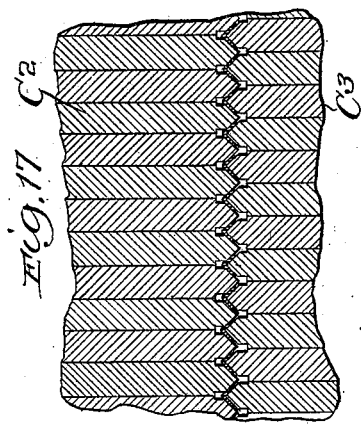
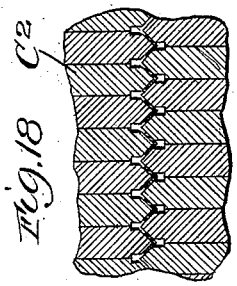
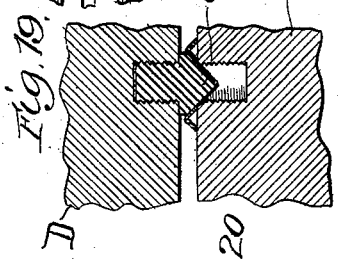
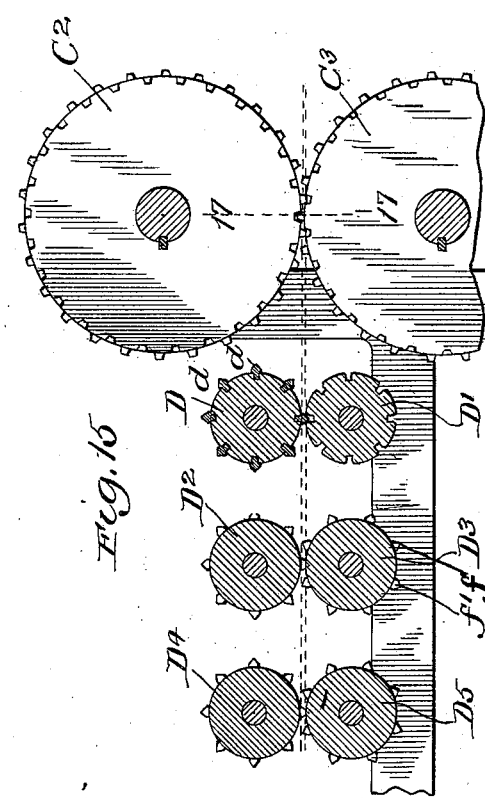
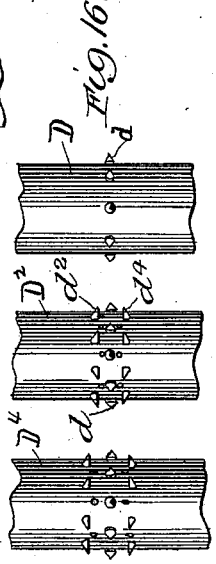
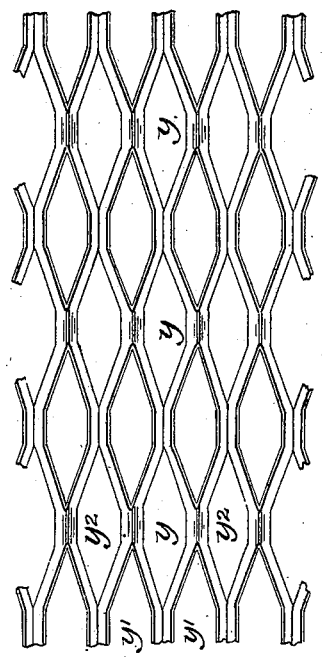
Witnesses:
Harold F. Barrett
Louis J. Delson
Inventor:
George A. Turnbull
By Charles W. Hills,
Atty.
THE NORRIS PETERS CO., PHOTO-LITHO., WASHINGTON, D. C.

UNITED STATES PATENT OFFICE.

GEORGE A. TURNBULL, OF CHICAGO, ILLINOIS.

MACHINE FOR MAKING EXPANDED METAL.

SPECIFICATION forming part of Letters Patent No. 664,193, dated December 18, 1900.

Application filed July 23, 1900. Serial No. 24,492. (No model.)

*To all whom it may concern:*

Be it known that I, GEORGE A. TURNBULL, a citizen of the United States, residing at Chicago, in the county of Cook and State of Illinois, have invented certain new and useful Improvements in Machines for Rolling Expanded Metal; and I do hereby declare that the following is a full, clear, and exact description of the same, reference being had to the accompanying drawings, and to the letters of reference marked thereon, which form a part of this specification.

This invention relates to rolling-machines of that class designed to roll or form expanded metal and more particularly designed to be used in the manufacture of expanded metal lath or the like. Heretofore the manufacture of laths of this kind has been comparatively expensive owing to the fact that it has been thought that the same could not be readily manufactured by rolling owing to the difficulty found in expanding the metal laterally to the required extent and with the required precision. My invention contemplates a construction whereby a sheet of metal may be readily formed and expanded, as herein shown, to double its original width to form metallic lath of any desired kind. As herein shown and described, however, the said machine is more particularly designed and adjusted for rolling and expanding the lath shown and described in the patent to me issued January 23, 1900, numbered 642,056, and in the patent to Brightman of the same class issued June 12, 1900, numbered 651,590.

The invention consists of the matters hereinafter described, and more fully pointed out and defined in the appended claims.

In the drawings, Figure 1 is a fragmentary top plan view of a machine embodying my invention. Fig. 2 is a longitudinal vertical section of the same. Fig. 3 is a side elevation of the same. Fig. 4 is a fragmentary detail section of the first expanding-roll. Fig. 5 is a fragmentary longitudinal section of one of the succeeding expanding-rolls. Fig. 6 is a fragmentary top plan view of a machine embodying my invention and designed to expand the metal from one side of the same. Fig. 7 is an enlarged section, partly broken, taken on line 7 7 of Fig. 2. Fig. 8 is a fragmentary detail of the same, illustrating a construction of the cutting-rolls. Fig. 9 is a fragmentary section taken on line 9 9 of Fig. 2, illustrating the operation of the forming-rolls. Fig. 10 is a fragmentary detail of one of said forming-rolls, showing the V's thereon over which the metal is bent or folded. Fig. 11 is a detail of one of the expanding-rolls, illustrating one form of the expanding points or pins. Fig. 12 is a view of a fragment of a sheet of metal, showing the same in a partly-finished condition and illustrating the operation of a machine expanding from the center. Fig. 13 is a similar view showing the metal slit and partly formed for expansion. Fig. 14 is a fragmentary view of one form of the finished product, showing the expansion complete. Fig. 15 is a fragmentary longitudinal section of my machine adjusted to roll and expand metallic lath similar to that shown in the Brightman patent aforesaid. Fig. 16 is a fragmentary detail of the expanding-rolls. Fig. 17 is a fragmentary section taken on line 17 17 of Fig. 15. Fig. 18 is a section similar to Fig. 17 and taken between axial centers at the next succeeding stage in the revolution of said roll. Fig. 19 illustrates the mode of operation of the first pair of expanding-rolls. Fig. 20 is a view of the Brightman form of metal lath.

As shown in the said drawings, the said machine comprises a frame having journaled therein one or more pairs of cutting or slitting rolls, (indicated by B and B', respectively,) forming-rolls C and C', adapted to take the metal from the slitting-rolls and to form the same preparatory to expanding, and a plurality of upper and lower expanding-rolls, (indicated by D D' D$^2$ D$^3$ D$^4$ D$^5$, &c., of which the letters with the even exponents indicate the upper roll and the letters with the odd exponents indicate the lower roll.) Said rolls are driven by a train of gears from a single source of power, as clearly shown in Figs. 1, 3, and 6. Referring more particularly to features of construction, said frame comprises upper horizontal members A and A', lower sills A$^2$, and uprights or legs connected with the same and indicated, respectively, by $a$ $a'$ $a^2$, &c. Said frame may be constructed of any desired material, but preferably will be constructed of metal and of sufficient weight and rigidity to afford a rigid bearing-surface for the mechanism it is designed to support. Journaled centrally at the feed end of said frame are cutting-rolls B and B', herein shown as two in number. One of said rolls, (the upper,) as shown, is provided with a plurality of knives set staggering on its periphery and a sufficient distance apart to form cuts a desired distance apart in a sheet of metal when passed between said rolls. As herein shown, said knives are set one-eighth of an inch apart on said rolls and are adjusted to overlap each other and to form cuts similar to those in the part marked $x$ in Fig. 13. Obviously said knives may be secured to the periphery of said cutting-roll in any desired or familiar manner. If preferred, part of said knives may be secured on one roll and part of the same secured on the other, thus permitting said knives to cut the sheet from both sides. For convenience in illustration, however, I have shown all of said knives on one roll and have shown the lower roll B' as provided with coacting surfaces complemental to said knives. The cutting-roll B, as shown, is made in sections and comprises a mandrel or shaft $b$, provided with a fixed key $b'$, extending the greater part of its length and having rigidly secured at one of its ends a collar $b^2$, against which and secured from rotation on the shaft by means of said key are secured alternately the rings $b^3$, having a thickness equal to the desired width between the cuts, and knife-plates $b^4$. Said knife-plates, as shown, are circular and each provided on its periphery with a plurality of cutters $b^5$, as shown in Fig. 2. The cutters of alternate knife-plates are so arranged as to be staggering on the roll when in operative position. A collar $b^6$, similar to the collar $b^2$, and a jam-nut $b^7$ are provided, having screw-threaded engagement with the shaft and adapted to clamp said rings and cutter-plates together. The lower roll B', as shown, is cast solid, but, if preferred, may be constructed in a manner similar to the roll B, in which event the plate and rings will be so proportioned relatively as to provide a plurality of peripheral grooves complemental to said knives and having sharp edges adapted to coact with said knives in cutting the sheet.

The forming-rolls C C', respectively, are located one above the other and are preferably of equal size with the cutting-rolls B and B' and similarly journaled in the frame adjacent to the same and adapted to receive the cut metal therefrom and form the same, as indicated at $x'$ in Fig. 13, in which, as shown, the adjacent edges on each side of each cut in the metal are forced downwardly, while the connecting metal between the same is supported to form a ridge in the form of an inverted V. The rolls may be constructed solid, and one of the same, as shown in Figs. 2, 9, and 10, (the lower,) is provided on its periphery with forming-dies $C^3$, shaped like inverted V's and equally spaced about the same and adjusted on the roll staggering and a distance between centers equal to the width of the webs between the cuts in the sheet. The other roll, C, is provided on its periphery with a plurality of punches arranged complementally with said V's and adapted to mesh between the same. Said rolls C and C' are so adjusted with respect to the cutting-rolls and to each other that when the cut sheet is fed between said forming-rolls the points $c^3$ $c^3$ engage centrally on the cut edges of the webs, while the central portion of said web is supported on the V's $C^2$ $C^2$, as shown in Fig. 9, with the result that said punches, with the continued rotation of said rolls, act to force the said cut edges downwardly while the central portion of said web is sustained, with the effect of forming the metal, as illustrated in said Fig. 9 and the part marked $x'$ in Fig. 13. Obviously from the construction described the cut edges are all forced in one direction, either downwardly or upwardly, depending upon which roller is provided with the punches and which with the V's. If preferred, said V's and punches may be placed alternately on both the upper and the lower rolls and arranged to mesh, as shown in Figs. 17 and 18. In this construction the webbed edges of alternate cuts are forced oppositely, with the effect of forming the sheet to make the Brightman lath. Such an adjustment is illustrated in Figs. 15, 17, and 18, in which $C^2$ $C^3$ indicate, respectively, the upper and lower forming-rolls, which are each, as shown, constructed of a series of plates or sections each provided alternately on its periphery with forming V's or dies and with forming-punches, and said plates are adjusted with respect to each other so that said forming V's or dies and punches of one roll mesh between the punches and dies of the other. Obviously it is not essential that either of said rolls be constructed in section, inasmuch as the V's and punches may be formed on the face or may be separate and secured in any desired manner to a solid roll. Neither is it essential that but one pair of forming-rolls be employed, for obviously, if desired, two or more pairs of such rolls may be journaled side by side and adapted to form the sheet in any desired manner preparatory to expanding the same.

The expanding-rolls, as shown, are of less diameter than the cutting and forming rolls, but are geared to have the same peripheral speed as said rolls, being therefore adapted to operate on the sheet of metal while the cutting and forming rolls are also operating upon it. Figs. 1, 2, and 6 are views of the machine set or adjusted to expand the metal, as illustrated in Fig. 14, or, in other words, to expand metal in that form in which the V's of the sheet are all similarly directed.

Referring first to the machine illustrated in Fig. 1, it is designed to expand the sheet laterally from the center of the same and to engage the sheet centrally in each of the central lines of spaces or pockets marked $x^2$ on Fig. 13 and to expand the sheet laterally from the center by forcing the V's of the sheet opposite to the same outwardly. As shown, the pins are of the width of the desired space—that is to say, approximately one-fourth of an inch. The lower roll D' is provided with a groove or with sockets complemental to the pins on the upper roll and adapted to receive the ends of the same. The roll $D^2$ or the succeeding expanding-rolls are preferably provided with pins $d\,d$, corresponding to the similar pins on the roller D and adapted to act as guides for the metal during the expanding operation. Said roll $D^2$ is also provided on each side of said guide-pin with the pins $d'\,d^2\,d^3\,d^4$, of which the pins $d'\,d^2$ are on the right side of the roll, while the pins $d^3\,d^4$ are on the left side of the same. Said pins are similar to the pins $d$, except that the points of the same adjacent to the said pins $d$ are nearly straight, while the points on the side opposite are inclined outwardly, as shown in Fig. 1, thereby acting to push the outer web laterally. The lower roll $D^3$ is provided with circumferential grooves or with sockets adapted to receive the points of said pins when engaging the metal sheet and serves to support the sheet during the expansion. The next succeeding roll $D^4$ is provided with central guide-pins $d$, as described, and on each side of the same with two rows of guide-pins $d^5\,d^6\,d^7\,d^8$, which are set at a distance one-fourth of an inch between centers from the next preceding and succeeding rows of pins and operate in a manner similar to that already described. The succeeding top rolls are likewise provided with central guide-pins $d$, and on each side of the same at one-fourth-inch centers from the preceding ones are provided expanding-pins similar to those heretofore described. The operation of this form of my device is as follows: A sheet of metal of desired width—say seven and one-half inches—and a desired length being fed into the cutting-roll, the same is slit, as illustrated in Fig. 13, and formed by the forming-rolls, as illustrated by the part marked $x'$ in said Fig. 13. As the front end of said strip passes from the forming-roll it is engaged between the rolls D D', which, however, of themselves exert no pressure thereon, and the pins $d\,d$ enter the central line of slots or pockets marked $x^2$ in said Fig. 13 and dilate or expand the metal laterally till said slot or pocket is of the desired width. Said lateral expansion acts to open the next succeeding slot or pocket sufficiently to permit engagement with the next succeeding lateral pins $d'\,d^3$ on each side of said central slot, with the effect of expanding the same laterally. Inasmuch, however, as the slope of said pin is mostly on the outer side of the same, expansion of said metal will be wholly outward, with the effect of partially expanding the slots or pockets beyond the same and permitting the engagement therein of the pins $d^2\,d^3$ to operate as before described. Each succeeding pair of rolls likewise expands on each side of the sheet two of the slots until the operation is complete. The amount of the expansion depends upon the size and the set of the pins and the distance apart of the slits or cuts in the metal. As herein shown, said cuts are one-eighth of an inch apart, and the metal being designed for use as lath the expansion in each slot is one-eighth of an inch. It follows that the sheet when the operation is complete is expanded to double its original width, or if originally seven and one-half inches to fifteen inches.

Obviously, if preferred, the machine may be set to expand wholly from one side of the sheet, and such a construction is illustrated in Fig. 6, in which the rollers B B' C C' are set to run close to the frame member A'. Rolls D $D^2\,D^4$, &c., are each provided with two rows of expanding-pins arranged staggering, as before described, and of which the pins $e\,e'$ are set close to the end of the roller D. Said pins engage the first and second of the slots or pockets in the sheet and expand the webs toward the opposite end of the roll. The last row of said pins serves to partly open the next pocket or slot to receive the pins $e^2\,e^3$ of the roll $D^2$, upon which and the succeeding corresponding rolls there are also two rows of pins, as before described. With this arrangement a greater number of expanding-rolls are required than when adjusted to expand the metal from the center. Said expanding-pins, as shown, are interchangeable and obviously may be set in the upper or the lower rolls, as preferred, or when the forming-rolls are set to form the V's oppositely, as illustrated in Fig. 15, the expanding-rolls will be adjusted with pins alternating first on the upper and then on the lower rolls, as illustrated in Figs. 15, 16, and 19, in which case the pins $d\,d$ are inserted, as heretofore described, in the roll D, and the roll D' is provided with sockets complemental thereto, as before described. The roll $D^3$ is provided with expanding-pins adapted to be inserted upwardly in the sheet and set at one-fourth-inch centers laterally on each side of the pins $d$. The roll $D^2$ is provided with pins $d$, which after the first roll act as guide-pins. On the lower roll $D^3$ on each side of the center is a row of pins $f\,f'$, respectively, which operate similarly to those already described and are set with one-fourth of an inch between centers laterally of said pins $d$. On each side of the pins $d$ on the roll $D^2$ is provided a row of pins $d^2\,d^4$, respectively, set at one-fourth-inch centers laterally from pins $f\,f'$ on the lower roll $D^3$. In the same manner each set of rolls is provided with a row of expanding-pins on each side of the center on each roll, of which the ones on the lower roll are set over one-fourth of an inch laterally from the pins on the preceding upper roll, and the pins on the upper roll are set over the same distance laterally of the pins on the corresponding lower roll. Obviously, however, if preferred, the arrangement of pins on the upper and lower rolls may be reversed and those on the upper be arranged to operate the first. A convenient manner of securing said pins in said rolls and to render the same adjustable as to height and direction of inclination is to screw-thread the inner ends of the pins and provide screw-threaded apertures at the desired points on the rolls adapted to receive the same. If both rolls of a set are provided with corresponding apertures, obviously the apertures of one will serve as sockets for the pins of the other, as shown in Figs. 15 and 19.

The operation of the machine when adjusted as above described is essentially similar to the operation before described, with the exception that as the sheet passes from the forming-roll the pockets are oppositely faced on each side of the sheet and the V's alternately open on the upper and lower sides of the same. The pins $d$ engage the slots or pockets indicated by $y$, Fig. 20, expanding the same to the position therein shown, and the next succeeding pins $f f'$ on the lower roll $D^3$ engage the sheet in the next succeeding slot $y'$ on each side of the slot $y$ and expand the same from below, while the pins $d^2 d^4$ engage said sheet from above in the slots $y^2 y^2$. This operation is repeated progressively on each side of the central line of said sheet until the same leaves the machine expanded to the desired extent.

The rolls may be geared in any desired manner and may be provided at the journal-boxes with any desired means for adjusting the same longitudinally of the machine. Fig. 3 illustrates one way of driving said rolls with equal peripheral speed. As shown, H indicates the main driving-shaft, provided with a driving-pulley $h$ in a familiar manner and with a pinion $h'$, meshing on opposite sides with the gears $h^2 h^3$, which are respectively secured each on the ends of the shafts for the rolls B' and C'. Similar gears $h^4 h^5$ are secured on the corresponding ends of the shafts for the rolls B and C and intermesh with the gears $h^2 h^3$, thereby acting to drive corresponding rolls in the same direction and the upper and lower roll of each pair oppositely. A gear $h^6$ is secured concentric with the gear $h^3$, which intermeshes with a transmitting-gear $h^7$, secured on the side of the frame in position to intermesh with the gear $h^8$ on the shaft for roll D', which in turn intermeshes with a gear $h^9$ on the roll D. Each succeeding pair of rolls is provided with intermeshing gears in like manner, and between the lower gears of each pair is an intermeshing transmitting-gear $h^{10}$. Said gears are so proportioned that the peripheral speed of all the rolls is the same. As a further improvement I provide a transverse bar G, supported on said frame and provided with teeth or fingers extending between the knives on the cutting-rolls and adapted to strip the metal sheet therefrom. Said bar may be constructed in any desired manner. Preferably, however, its front edge is relatively thin and provided with a plurality of slits adapted to permit the passage of the knives therethrough and engaging with its front end the surface of said roll between said knives.

Obviously many of the details of construction illustrated and above described are not essential to the carrying out of the broad features of my invention when separately considered. The scope of the invention will be set forth in the concluding claims, and it is to be understood that the omission of an element or the omission of any particular feature of any of the elements mentioned in any given claim is intended as a formal declaration that the omitted elements or features are not essential to the invention therein covered.

I claim as my invention—

1. The combination with cutting-rolls and forming-rolls, of expanding-rolls provided with means for engaging a sheet of metal received from the forming-rolls and acting to force the same laterally.

2. The combination with cutting-rolls, of forming-rolls, of a plurality of pairs of rolls adapted to receive a sheet of metal or the like from the forming-rolls and provided with means acting to expand said sheet uniformly and laterally to a desired width.

3. The combination with cutting-rolls, of forming-rolls provided on their peripheries with coacting dies and punches, and expanding-rolls adapted to receive a sheet of metal or the like from said forming-rolls and provided with means adapted to expand said sheet laterally.

4. The combination with cutting-rolls adapted to slit a sheet of metal longitudinally, of forming-rolls provided with parts adapted to engage the slit edges of said metal and bend the same out of the plane thereof, and a plurality of expanding-rolls between which said sheet is passed, said expanding-rolls being provided with means adapted to engage said sheet of metal in said slits and acting to expand the sheet laterally.

5. The combination with cutting-rolls adjusted to slit a sheet of metal longitudinally, of forming-rolls, coacting dies on the peripheries thereof adapted to bend the slit edges of said metal out of the plane thereof, and a plurality of expanding-rolls between which said sheet is passed, said expanding-rolls being provided with means adapted to engage said sheet of metal in the slits and acting to expand the sheet laterally.

6. The combination with cutting-rolls and forming-rolls, of a plurality of expanding-rolls adapted to receive a sheet of metal therefrom, said expanding-rolls being provided peripherally with projections adapted to engage the cut edges of said sheet of metal and acting to force the same laterally.

7. The combination with cutting-rolls and forming-rolls, of a plurality of expanding-rolls adapted to receive a sheet of metal therefrom, said expanding-rolls being provided peripherally with projections set staggering with respect to each other and adapted to engage the cut edges of said sheet of metal and acting to force the same laterally.

8. The combination with cutting-rolls and forming-rolls, of a plurality of expanding-rolls adapted to receive a sheet of metal therefrom, said expanding-rolls being arranged in pairs and one roll of each pair being provided peripherally with projections adjusted to engage the cut edges of a sheet of metal and acting to force the same laterally.

9. The combination with cutting-rolls and forming-rolls, of a plurality of pairs of expanding-rolls adapted to receive a sheet of metal from said forming-rolls, one roll of each of said pairs of expanding-rolls being provided peripherally with radial projections set staggering and adjusted to engage in slits in said sheet of metal and acting to expand said sheet laterally of said rolls.

10. The combination with cutting-rolls adjusted to cut a plurality of slits in a sheet of metal or the like, of forming-rolls, peripheral coacting dies and punches on said forming-rolls, a plurality of pairs of expanding-rolls adapted to receive the sheet of metal from the forming-rolls, one roll of each pair being provided peripherally with projections adapted to engage slits in said sheet of metal and acting to force the same laterally.

11. The combination with cutting-rolls, of forming-rolls, coacting dies and punches on the peripheries of the same, a plurality of pairs of expanding-rolls adapted to receive a sheet of metal from the forming-rolls, corresponding rolls of each pair of expanding-rolls being provided peripherally with radial projections adapted to engage in slits in said sheet of metal and acting to expand the same laterally.

12. The combination with cutting-rolls, of forming-rolls having on their peripheries coacting dies and punches, a plurality of pairs of expanding-rolls adapted to receive a sheet of metal from said forming-rolls, one roll of each pair of expanding-rolls being provided peripherally with radial projections having outwardly-beveled points and adjusted to engage in slits in said sheet of metal.

13. The combination with a plurality of cutting-rolls provided with knives set staggering with each other and adapted to form a plurality of relatively short parallel overlapping slits in a sheet of metal or the like, of a plurality of forming-rolls adapted to engage the metal between said slits and form alternate V-shaped ridges and open slots or pockets, and a plurality of pairs of expanding-rolls adapted to receive the said sheet from said forming-rolls and means carried by each pair of expanding-rolls adapted to engage said sheet in alternate slots or pockets and acting to force the V's laterally.

14. The combination with a plurality of cutting-rolls adapted to form a plurality of relatively short parallel overlapping slits in a sheet of metal or the like, of a plurality of forming-rolls provided peripherally with coacting surfaces adapted to form said sheet between said slits into alternate ridges and open slots or pockets, a plurality of pairs of expanding-rolls adapted to receive the sheet therefrom and means carried by one of each pair of expanding-rolls adapted to engage said sheet in alternate slots or pockets and acting to force the said ridges laterally.

15. The combination with cutting-rolls adapted to form a plurality of short parallel overlapping slits in a sheet of metal or the like, of a plurality of forming-rolls provided with coacting surfaces adapted to force the cut edges in said slits out of the plane of the sheet, thereby forming open slots or pockets, a plurality of pairs of expanding-rolls adapted to receive said sheet from the forming-rolls and provided with projections having outwardly-inclined points adjusted to engage said sheet successively in said slots or pockets and acting to expand the sheet laterally.

16. The combination with a plurality of rolls provided with knives adapted to cut a sheet of metal in relatively short overlapping parallel slits, a plurality of forming-rolls provided with coacting dies and punches adapted to form V-shaped ridges between said slits and slots or pockets between said ridges, and a plurality of pairs of expanding-rolls provided with means for engaging said sheet in alternate slots or pockets and acting to expand said sheet laterally.

17. The combination with cutting-rolls adapted to cut a sheet of metal into a plurality of relatively short parallel overlapping slits a desired distance apart, of a plurality of forming-rolls adapted to receive the metal from the cutting-rolls and provided with coacting dies adapted to form in said sheet between said slits a plurality of V-shaped ridges alternating with slots or pockets, a pair of expanding-rolls provided on the periphery with pins arranged staggering to correspond with the pockets of slots in said sheet adapted to engage said sheet successively in said slots or pockets, and acting to expand said sheet laterally.

18. The combination with cutting-rolls adapted to slit a sheet of metal into a plurality of relatively short parallel overlapping slits a desired distance apart, of a plurality of forming-rolls adapted to receive the metal from the cutting-rolls and provided with coacting dies adapted to form said sheet between said slits into a plurality of ridges alternating with slots or pockets and a plurality of pairs of expanding-rolls provided on their periphery with pins arranged staggering to correspond with the pockets or slots in said sheet and adjusted to successively engage in the same and acting to expand said sheet laterally.

19. The combination with cutting-rolls adapted to slit a sheet of metal into a plurality of relatively short parallel overlapping slits a desired distance apart, of a plurality of forming-rolls adapted to receive the metal from the cutting-rolls and provided with coacting dies adapted to form in said sheet a plurality of V-shaped ridges alternating with slots or pockets, a plurality of pairs of expanding-rolls provided on their periphery with pins arranged staggering having inclined points and adjusted to engage said sheet successively in said slots or pockets and acting to expand the sheet laterally.

20. The combination with cutting and forming rolls, of a plurality of expanding-rolls adapted to receive a sheet of metal therefrom, said expanding-rolls having the same peripheral speed as the cutting and forming rolls and provided with means for expanding the cut and formed sheet of metal laterally.

21. The combination with cutting and forming rolls, of a plurality of expanding-rolls arranged in pairs and adapted to receive a sheet of metal therefrom, corresponding rolls thereon each provided with one or more rows of pins in corresponding rolls in each pair, said pins being arranged peripherally staggering with respect to the pins on the same roll and succeeding roll.

22. The combination with cutting and forming rolls, of a plurality of expanding-rolls adapted to receive a sheet of metal therefrom, said expanding-rolls being arranged in pairs, and corresponding rolls of each pair being provided peripherally with adjustable pins arranged staggering with the pins on the same roll and the succeeding rolls, the other roll in each pair being provided with sockets adapted to receive the points of said pins.

23. The combination with cutting and forming rolls, of a plurality of expanding-rolls adapted to receive a sheet of metal therefrom, said expanding-rolls being arranged in pairs, the corresponding rolls of each pair being provided with interchangeable pins having outwardly-inclined points and arranged peripherally in rows on said rolls, each of said rolls being provided with two or more of said rows, the pins on each roll being arranged staggering with respect to each other and with the pins on the succeeding rolls and sockets on the other roll of each pair adapted to receive the points of said pins, said pins being adapted to engage slits in said sheet and expand the same.

24. The combination with cutting and forming rolls, of a plurality of pairs of expanding-rolls adapted to receive a sheet of metal therefrom, said expanding-rolls being provided with interchangeable duplicate pins having inclined points said pins on each roll being more remote from the middle of the roll than the pins on the preceding roll.

25. The combination with a pair of oppositely-rotating cutting-rolls located one above the other, of oppositely-rotating forming-rolls similarly placed, and of equal size, a plurality of pairs of upper and lower coacting expanding-rolls having less diameter than the aforesaid rolls, means for rotating said rolls with equal peripheral velocity, and means on said expanding-rolls acting to engage a cut and formed sheet of metal at the center and acting to expand the same laterally.

26. The combination with cutting-rolls adapted to slit a sheet of metal in a plurality of relatively short overlapping parallel slits a desired distance apart, forming-rolls provided on their peripheries respectively with coacting dies and punches adapted to form said sheet into alternating V-shaped ridges and open slots or pockets, a plurality of pairs of oppositely-rotating expanding-rolls located one above the other and adapted to receive said sheet from the forming-roll, and means on each pair of said expanding-rolls acting to expand said sheet laterally.

27. The combination with cutting-rolls adapted to slit a sheet of metal in a plurality of relatively short overlapping parallel slits a desired distance apart, forming-rolls provided on their peripheries respectively with coacting dies and punches adapted to form said sheet into alternating ridges and open slots or pockets, a plurality of pairs of oppositely-rotating expanding-rolls located one above the other and adapted to receive said sheet from the forming-roll, and a row of peripheral pins set staggering on said corresponding expanding-rolls said pins having their surfaces near their points adapted to engage in said slots or pockets and acting successively to expand the sheet.

28. The combination with a plurality of cutting-rolls each provided with a plurality of relatively short slitting-knives set staggering with each other and spaced a desired distance apart and adapted to slit a sheet of metal in a plurality of overlapping parallel short slits or cuts, a pair of oppositely-rotating forming-rolls provided respectively with peripheral coacting dies and punches adapted to form the slit sheet between said slits in ridges, having between the same diamond-shaped slots or pockets, a plurality of pairs of expanding-rolls adapted to receive the sheet from the forming-rolls, each pair of said expanding-rolls having secured thereon one or more interchangeable peripheral rows of pins the points of which enter complemental sockets in the complemental corresponding roll, said pins being set staggering and adapted to successively engage in said diamond-shaped pockets in said sheet and successively expand the sheet laterally.

29. The combination with cutting-rolls having removably secured thereon a plurality of relatively short slitting-knives set staggering with each other and spaced a desired distance apart and adapted to slit a sheet of metal into a plurality of short overlapping parallel slits or cuts, upper and lower forming-rolls each provided with peripheral coacting dies adjusted to form ridges between said slits, and diamond-shaped slots or pockets between said ridges, a plurality of pairs of coacting expanding-rolls adapted to receive the sheet from said forming-rolls, the rolls of each pair being provided with one or more rows of peripheral angular-pointed pins arranged staggering with each other and adapted successively to engage in said slots or pockets and acting to expand the sheet laterally.

30. The combination with cutting-rolls one of which is provided with a plurality of removable knives arranged staggering and spaced a desired distance apart and adapted to slit a sheet of metal into a plurality of overlapping parallel short slits or cuts, an upper and a lower forming-roll provided with alternate coacting dies and punches adapted to form the sheet between said slits into oppositely-directed V-shaped ridges having between the same oppositely-flared diamond-shaped slots or pockets, a plurality of pairs of upper and lower expanding-rolls said rolls having secured thereon a peripheral row of pins alternating from the upper and lower rolls out of alinement with each other and adapted to successively engage in said diamond-shaped pockets from opposite sides of the sheet.

31. The combination with cutting-rolls one of which is provided with a plurality of removable knives arranged staggering and spaced a desired distance apart and adapted to slit a sheet of metal into a plurality of overlapping parallel slits, an upper and a lower forming-roll provided with alternate coacting dies and punches adapted to form the sheet between said slits into oppositely-directed V-shaped ridges having between the same oppositely-flared diamond-shaped slots or pockets, a plurality of pairs of upper and lower expanding-rolls each roll having secured thereon a peripheral row of pins alternating from the upper and lower rolls, out of alinement with each other and adapted to successively engage in said pockets from opposite sides of the sheet, said pins first engaging said sheet in a central line and adapted to expand the same laterally.

32. The combination with a plurality of coacting cutting-rolls, of a plurality of coacting forming-rolls, each of said forming-rolls consisting of a plurality of circular plates secured axially upon a shaft or mandrel, each of said plates being provided alternately upon its periphery with dies and punches adapted to form a slit sheet into alternating V-shaped ridges and diamond-shaped pockets.

33. The combination with a plurality of coacting cutting-rolls, of a plurality of forming-rolls adapted to receive a sheet of metal or the like therefrom, said forming-rolls each comprising a plurality of circular plates adapted to be clamped together upon an axial shaft or mandrel and provided on the periphery with alternate dies and punches, said plates when in operative position being so adjusted that said dies and punches are arranged staggering with each other and adapted to form the sheet into alternate V-shaped ridges and diamond-shaped pockets.

34. The combination with a plurality of cutting-rolls, of a plurality of forming-rolls, each of said forming-rolls being provided with alternate dies and punches arranged staggering with each other, said rolls being composed of interchangeable duplicate parts axially secured upon a mandrel and expanding means adapted to engage a cut sheet as it comes from said rolls and acting to successively expand the parts thereof.

35. The combination with cutting-rolls, of means for stripping the cut sheet of metal or the like therefrom, forming-rolls adapted to receive the sheet from the cutting-rolls, said forming-rolls being provided on their periphery with coacting dies and punches adapted to form said sheet into alternate V-shaped ridges and oblong pockets and rolls acting to receive the sheet from said forming-rolls and which uniformly expand the same laterally.

36. The combination with a plurality of cutting-rolls, of a plurality of forming-rolls adapted to form alternate ridges and slots in a sheet received from the cutting-rolls, each of said forming-rolls being provided on the periphery with alternate dies and punches arranged staggering with each other, means adapted to engage said sheet in said slits and acting to expand the sheet laterally.

37. The combination with cutting-rolls adapted to slit a sheet of metal or the like into a plurality of overlapping parallel slits, of forming-rolls provided with coacting surfaces acting to force the slit edges out of the plane of the sheet and means adapted to engage said sheet in said slits and acting to expand said sheet laterally.

38. The combination with cutting-rolls adapted to slit a sheet of metal or the like into a plurality of overlapping parallel slits, of forming-rolls provided with coacting surfaces acting to force the slit edges out of the plane of the sheet and means adapted to engage said sheet in said slits and acting to expand the sheet laterally said means first engaging said sheet centrally then successively engaging adjacent lateral slits until the expansion is complete.

39. The combination with cutting-rolls adapted to slit a sheet of metal or the like into a plurality of short parallel overlapping slits, of forming-rolls provided with coacting dies and punches adapted to form said sheet into alternate ridges and slots or pockets and means adapted to engage said sheet in said slits and acting to expand the sheet laterally, said means first engaging slots located centrally, then simultaneously and successively engaging adjacent slots until the expansion is complete.

40. The combination with cutting-rolls adapted to slit a sheet of metal into a plurality of relatively short parallel overlapping slits, of forming-rolls provided peripherally with coacting surfaces adapted to form in said sheet oppositely-directed ridges alternating with oppositely-opening slots or pockets, and means adapted to engage said sheet in said slots or pockets and acting to expand the sheet laterally.

41. The combination with cutting-rolls adapted to slit a sheet of metal into a plurality of relatively short parallel overlapping slits, of forming-rolls provided peripherally with coacting surfaces adapted to form in said sheet oppositely-directed ridges alternating with oppositely-opening slots or pockets, means adapted to engage said sheet in said slots or pockets and acting to expand the sheet laterally, said means first engaging the sheet centrally then simultaneously and successively engaging slots on each side of the center and guides acting to engage the expanded portion of the sheet until the expansion is complete.

42. In a machine of the class described an expanding-roll provided with guide-pins and expanding-pins arranged staggering with said guide-pins and having obliquely-inclined points.

43. In a machine of the class described the combination with cutting means and forming means, of upper and lower expanding-rolls adapted to engage between the same a slit sheet of metal, a plurality of rows of expanding-pins arranged on an expanding-roll, said expanding-pins being arranged staggering and adapted to successively engage in the slits in the sheet and acting to expand the sheet laterally.

44. The combination with slitting-rolls and forming-rolls, of a plurality of pairs of expanding-rolls, one of each pair of expanding-rolls being provided with a plurality of rows of expanding-pins having inclined points, said expanding-pins being arranged divergently on succeeding rolls and arranged staggering with each other.

45. In a machine of the class described the combination with cutting-rolls and forming-rolls adapted to slit and to form a sheet of metal into alternating ridges and open slots or pockets, of a plurality of pairs of expanding-rolls each pair of rolls being provided with pins having inclined points arranged staggering with each other and adapted to engage said sheet successively in said slots or pockets and the complemental rolls being provided with sockets adapted to receive the points of said pins, said pins being arranged divergently on succeeding rolls.

46. In a machine of the class described the combination with cutting-rolls and forming-rolls adapted to slit and form a sheet of metal into alternating ridges and open slots or pockets, of a plurality of pairs of expanding-rolls each pair of rolls being provided with pins having inclined points arranged staggering with each other and adapted to engage said sheet successively in said slots or pockets, the complemental rolls being adapted to receive the points of said pins, said rows of pins being arranged divergently on succeeding rolls and means for driving said cutting forming and expanding rolls at the same peripheral speed.

47. The combination with cutting-rolls and forming-rolls adapted to slit and form a sheet of metal into alternate ridges and open slots or pockets, of means carried by rolls adapted to engage said sheets in said slots or pockets and acting to expand the sheet laterally.

48. In a machine of the class described a plurality of pairs of rolls adapted to receive between the same a sheet of metal formed in alternate staggering slots and ridges and means carried by said rolls adapted to engage said sheet successively in said slots and acting to expand the sheet laterally.

49. In a machine of the class described a plurality of pairs of rolls adapted to receive between the same a sheet of metal or the like formed with staggering slots or pockets, guide-pins on one of each pair of rolls adapted to engage a line of pockets in said sheet and a plurality of rows of expanding-pins on each pair of rolls arranged staggering and adapted to engage said sheet alternately in said slots, said expanding-pins on succeeding rolls being arranged divergently.

50. An expanding-roll for a machine of the class described comprising a cylindric roll provided peripherally with removable pins having inclined points and arranged staggering with each other.

51. A pair of expanding-rolls for a machine of the class described comprising oppositely-revolving rolls located out of contact and one above the other each of said rolls being provided with a plurality of peripheral rows of screw-threaded sockets, each adapted to afford engagement for a screw-threaded expanding-pin, or to receive the point of an expanding-pin secured on the other roll.

52. In a machine of the class described, the combination with cutting-rolls adapted to form in a sheet of metal a plurality of short slits, of movable expanding means adapted to engage the sheet in said slits and acting to expand the sheet laterally.

53. The combination with cutting means adapted to slit a sheet of metal into a plurality of relatively short slits, of movable expanding means adapted to engage said sheet in said slits and acting to expand the sheet laterally.

54. The combination with cutting means and forming means adapted to slit and form a sheet of metal of movable expanding means adapted to engage the sheet in said slits and acting to expand the sheet laterally.

55. In a machine of the class described, movable expanding means adapted to engage a slit sheet of metal in the slits and acting to expand the sheet laterally.

56. The combination with cutting-rolls adapted to provide relatively short slits in a sheet of metal, of oppositely-movable expanding means adapted to engage said sheet in said slits and expand the same laterally.

57. The combination with cutting means adapted to slit a sheet of metal in relatively short slits, of movable oppositely-acting expanding means embracing adjustable pins adapted to engage the sheet in said slits and progressively expand the same laterally.

58. In a machine of the class described, the combination with cutting means adapted to slit a sheet of metal into a plurality of short slits, of movable expanding means embracing pins adapted to engage the sheet in said slits on each side of a median line and acting at approximately a right angle with the edges of the sheet.

In testimony whereof I have hereunto subscribed my name in the presence of two subscribing witnesses.

GEORGE A. TURNBULL.

In presence of—
C. W. HILLS,
LOUIS J. DELSON.